(12) United States Patent
Teramoto

(10) Patent No.: US 11,934,232 B2
(45) Date of Patent: Mar. 19, 2024

(54) ELECTRONIC APPARATUS

(71) Applicant: Panasonic Intellectual Property Management Co., Ltd., Osaka (JP)

(72) Inventor: Ryusuke Teramoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 247 days.

(21) Appl. No.: 17/520,677

(22) Filed: Nov. 7, 2021

(65) Prior Publication Data
US 2022/0057842 A1    Feb. 24, 2022

Related U.S. Application Data

(63) Continuation of application No. PCT/JP2020/016665, filed on Apr. 16, 2020.

(30) Foreign Application Priority Data

May 16, 2019  (JP) ................................. 2019-093053

(51) Int. Cl.
    *G06F 1/16*         (2006.01)
(52) U.S. Cl.
    CPC .......... *G06F 1/1656* (2013.01); *G06F 1/1616* (2013.01)
(58) Field of Classification Search
    CPC combination set(s) only.
    See application file for complete search history.

(56) References Cited

U.S. PATENT DOCUMENTS

| | | | | |
|---|---|---|---|---|
| 5,359,587 A | * | 10/1994 | Uehara ................ | G11B 33/022 16/268 |
| 7,692,921 B2 | * | 4/2010 | Ooe ...................... | G06F 1/1656 439/607.11 |
| 7,760,289 B2 | * | 7/2010 | Nakanishi ............. | G06F 1/1658 349/60 |

(Continued)

FOREIGN PATENT DOCUMENTS

| | | |
|---|---|---|
| JP | S59-104583 U | 7/1984 |
| JP | H10-014059 A | 1/1998 |

(Continued)

OTHER PUBLICATIONS

International Search Report for related Application No. PCT/JP2020/016665, dated Jun. 23, 2020.

*Primary Examiner* — Lisa Lea-Edmonds
(74) *Attorney, Agent, or Firm* — Renner, Otto, Boisselle & Sklar, LLP

(57) ABSTRACT

An electronic apparatus includes an upper case and a lower case. An end face of the upper case includes a first upper step surface and a second upper step surface located at high and inner positions with respect to the first upper step surface. An end face of the lower case includes a first lower step surface, a second lower step surface located at high and inner positions with respect to the first lower step surface, and a third lower step surface located at high and inner positions with respect to the second lower step surface. The first upper step surface is located at a low position with respect to the second lower step surface and faces the first lower step surface. The second upper step surface is located at a low position with respect to the third lower step surface and faces the second lower step surface.

6 Claims, 4 Drawing Sheets

(56) References Cited

U.S. PATENT DOCUMENTS

| | | | | |
|---|---|---|---|---|
| 8,009,411 B2 * | 8/2011 | Ooe | ............... | G06F 1/1656 |
| | | | | 174/374 |
| 8,033,418 B2 * | 10/2011 | Estlander | ............ | H05K 5/0208 |
| | | | | 220/678 |
| 8,058,553 B2 * | 11/2011 | Saito | ............... | G06F 1/1616 |
| | | | | 361/679.26 |
| 8,273,987 B2 * | 9/2012 | Saito | ............... | G06F 1/1656 |
| | | | | 361/679.26 |
| 8,431,819 B2 | 4/2013 | Pitkonen | | |
| 9,432,491 B2 * | 8/2016 | Ogatsu | ............ | H05K 5/063 |
| 9,501,095 B2 * | 11/2016 | Itaya | ............... | G06F 1/1601 |
| 9,551,890 B2 * | 1/2017 | Yamashita | ........ | G02F 1/133308 |
| 9,977,467 B2 * | 5/2018 | Garelli | ............ | G06F 1/1656 |
| 2009/0002930 A1 * | 1/2009 | Nakanishi | ............ | G06F 1/1658 |
| 2010/0182758 A1 * | 7/2010 | Ooe | ............... | G06F 1/1616 |
| | | | | 361/752 |
| 2012/0001525 A1 * | 1/2012 | Ogatsu | ............ | H04M 1/18 |
| | | | | 312/223.1 |
| 2012/0014083 A1 * | 1/2012 | Saito | ............... | G06F 1/1616 |
| | | | | 361/807 |
| 2012/0085766 A1 * | 4/2012 | I | ............... | H02G 3/088 |
| | | | | 220/378 |
| 2013/0235538 A1 * | 9/2013 | Hashimoto | ............ | H04N 5/645 |
| | | | | 361/752 |
| 2018/0081400 A1 * | 3/2018 | Pandya | ............ | F16J 15/064 |

FOREIGN PATENT DOCUMENTS

| | | |
|---|---|---|
| JP | 2010-285185 A | 12/2010 |
| JP | 2014-187569 A | 10/2014 |
| WO | 2010/119663 A1 | 10/2010 |

\* cited by examiner

ELECTRONIC APPARATUS

BACKGROUND

1. Technical Field

The present disclosure relates to an electronic apparatus including a housing.

2. Description of the Related Art

For example, Patent Literature (PTL) 1 discloses an electronic apparatus including a housing constructed from two cases. In this electronic apparatus, a recess for accommodating a packing is formed on an end face of an outer wall of one case, and an end face of an outer wall of the other case is in contact with the end face of the outer wall of the one case and the packing. Accordingly, entry of liquid into the housing through between the end faces of the respective outer walls of the two cases is suppressed.

PTL 1 is Unexamined Japanese Patent Publication No. 2014-187569.

SUMMARY

However, in the case of the waterproof structure of the electronic apparatus of PTL 1, a packing is required. In addition, since the recess for accommodating the packing is formed on the end face of the outer wall of one case, the outer wall becomes thick. As a result, the housing is enlarged.

Therefore, an object of the present disclosure is to suppress entry of liquid into the housing through between the end faces of the outer walls without using a seal member such as a packing in the electronic apparatus in which the housing is configured such that the end faces of the outer walls of two cases face each other.

According to one aspect of the present disclosure, an electronic apparatus is provided which includes:

a housing including an upper case and a lower case; and an electronic component housed in the housing, in which an end face of an outer wall of the upper case includes a first upper step surface and a second upper step surface located at a high position and an inner position with respect to the first upper step surface, an end face of an outer wall of the lower case includes a first lower step surface, a second lower step surface located at a high position and an inner position with respect to the first lower step surface, and a third lower step surface located at a high position and an inner position with respect to the second lower step surface, the first upper step surface is located at a low position with respect to the second lower step surface and faces the first lower step surface, and the second upper step surface is located at a low position with respect to the third lower step surface and faces the second lower step surface.

According to the present disclosure, in the electronic apparatus in which the housing is configured such that the end faces of the respective outer walls of the two cases face each other, entry of liquid into the housing through between the end faces of the outer walls can be suppressed without using a seal member such as a packing.

DETAILED DESCRIPTION

An exemplary embodiment will be described in detail below with reference to the drawings as appropriate. However, detailed description more than necessary might be sometimes omitted. For example, the detailed description of already well-known matters and the overlapped description of a configuration substantially identical to already-described one may be omitted. This is to avoid the description below from being unnecessarily redundant and thus to help those skilled in the art to easily understand the description.

Note that the inventor provides the attached drawings and the description below to help those skilled in the art fully understand the present disclosure, and does not intend to limit the subject matter as recited in the claims to these.

Hereinafter, an electronic apparatus according to one exemplary embodiment of the present disclosure will be described below with reference to FIGS. 1 to 4.

Figure 1:
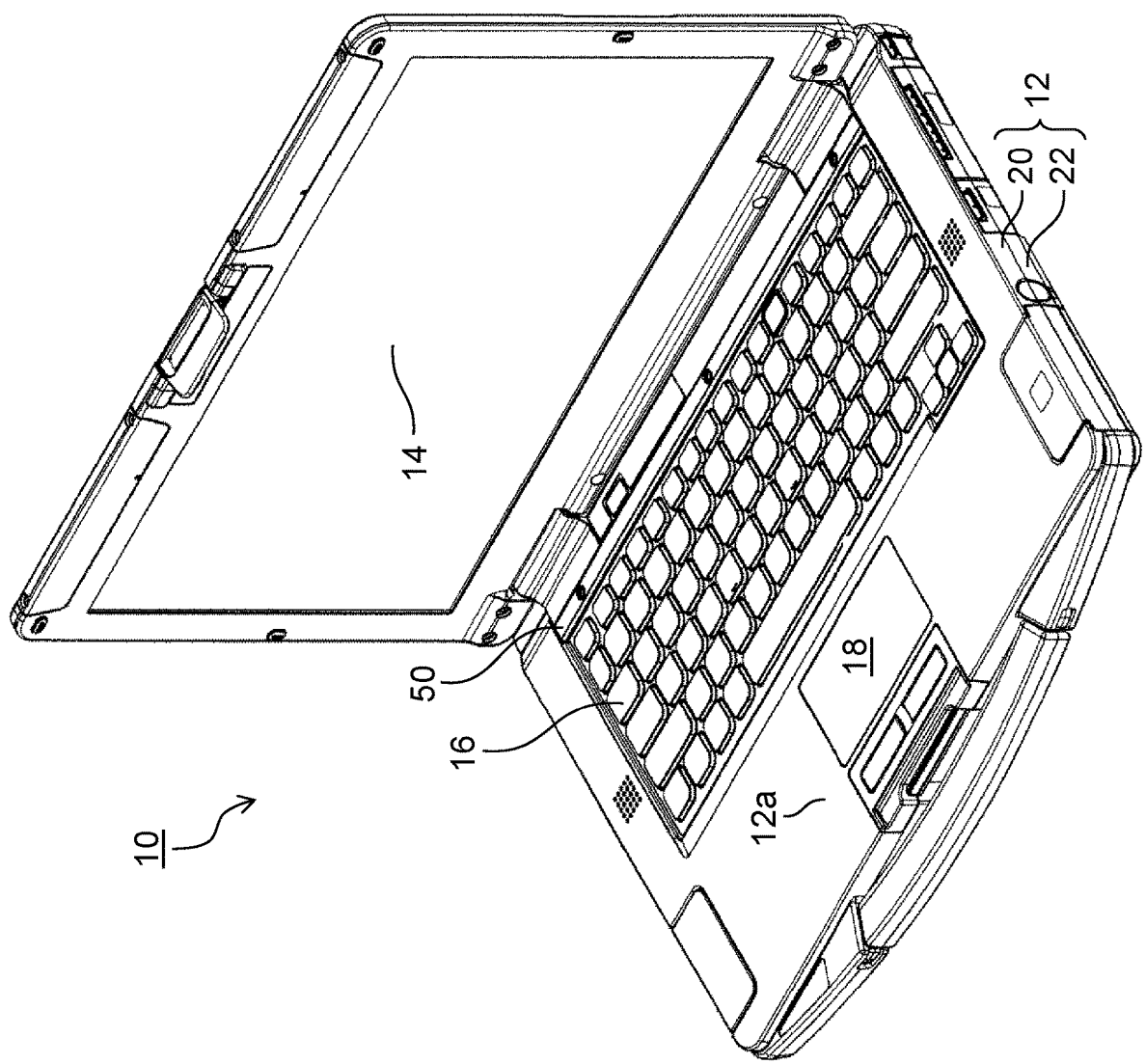
FIG. 1 is a perspective view of an electronic apparatus according to one exemplary embodiment of the present disclosure.

FIG. 1 is a view illustrating an electronic apparatus according to one exemplary embodiment of the present disclosure. Note that an X-Y-Z coordinate system illustrated in the drawings is for facilitating understanding of the exemplary embodiment, and does not limit the exemplary embodiment. In the X-Y-Z coordinate system, an X-axis direction is a width direction of an electronic apparatus, a Y-axis direction is a depth direction, and a Z-axis direction is a thickness direction.

As illustrated in FIG. 1, electronic apparatus 10 according to the present exemplary embodiment is a so-called notebook personal computer, and includes housing 12 and display 14 rotatably attached to housing 12.

Keyboard 16 and touch pad 18 are provided on upper surface 12a of housing 12 of electronic apparatus 10.

Figure 2:
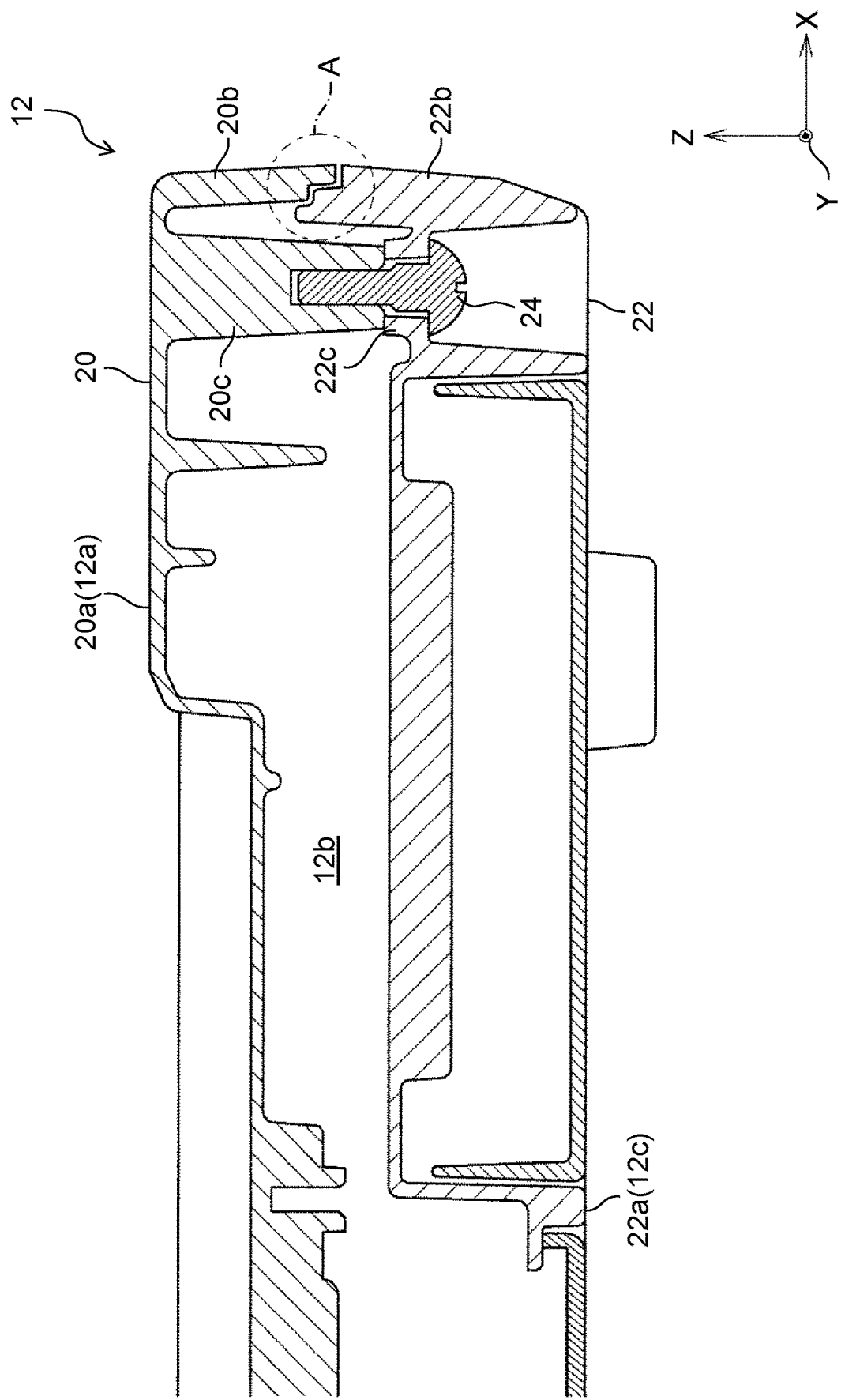
FIG. 2 is a partial cross-sectional view of a housing of the electronic apparatus.
Figure 3:
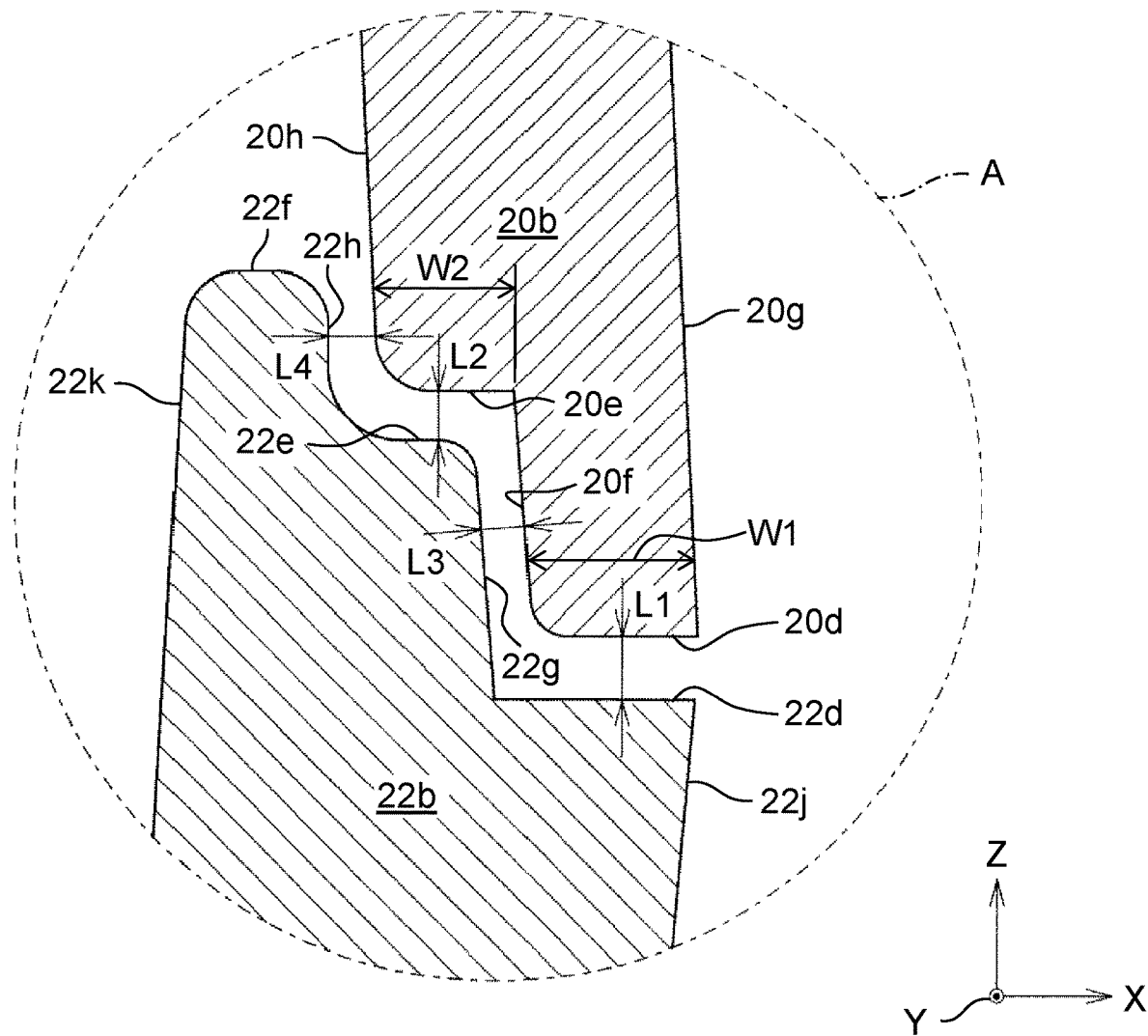
FIG. 3 is an enlarged cross-sectional view of a region A illustrated in FIG. 2.

FIG. 2 is a partial cross-sectional view of the housing of the electronic apparatus, and FIG. 3 is an enlarged cross-sectional view of a region A illustrated in FIG. 2.

As illustrated in FIG. 2, housing 12 of electronic apparatus 10 includes upper case 20 and lower case 22, which face each other in a vertical direction (the Z-axis direction). Electronic components (not illustrated) such as a central processing unit (CPU), a storage device, and a circuit board are accommodated in space 12b formed between upper case 20 and lower case 22.

Specifically, upper case 20 and lower case 22 are made of, for example, a magnesium alloy material or a resin material, for example, using a mold. Upper case 20 generally includes top surface 20a constituting upper surface 12a of housing 12, and outer wall 20b extending in a downward direction from an outer peripheral edge of top surface 20a. Lower case 22 generally includes bottom surface 22a constituting lower surface 12c of housing 12, and outer wall 22b extending in an upward direction from an outer peripheral edge of bottom surface 22a. Upper case 20 and lower case 22 are arranged to face each other such that an end face of outer wall 20b and an end face of outer wall 22b face each other, thereby forming housing 12 of electronic apparatus 10.

In the case of the present exemplary embodiment, as shown in FIG. 3, an end face of outer wall 20b of upper case 20 and an end face of outer wall 22b of lower case 22 are not in contact with each other, and face each other in the vertical direction (Z-axis direction) at intervals. Instead, as shown in FIG. 2, a plurality of boss portions 20c (an example of upper boss portions) provided on upper case 20 and protruding downward, and a plurality of boss portions 22c (an example of lower boss portions) provided on lower case 22 and protruding upward are in contact with each other. Boss portions 20c, 22c in contact with each other are fixed to each other by screw 24. In FIG. 2, boss portions 20c, 22c are illustrated one by one.

That is, since boss portion 22c of lower case 22 supports boss portion 20c of upper case 20, the end face of outer wall 20b of upper case 20 and the end face of outer wall 22b of lower case 22 face each other with a space therebetween. This is because at least one of upper case 20 and lower case 22 can be deformed when boss portions 20c, 22c are fixed to each other by screw 24 in a state where the end face of outer wall 20b of upper case 20 and the end face of outer wall 22b of lower case 22 are in contact with each other. Specifically, in the case of the design in which the end faces of the outer walls are in contact with each other, when manufacturing variations occur in each of upper case 20 and lower case 22, for example, when the height of the outer walls varies, the end faces of outer walls 20b, 22b are in contact with each other, but boss portions 20c, 22c cannot be in contact with each other. When such boss portions 20c, 22c are forcibly brought into contact with each other by screw 24, strain deformation may occur in at least one of upper case 20 and lower case 22. Due to the deformation, damage such as a crack may occur in at least one of upper case 20 and lower case 22.

As described above and illustrated in FIG. 3, the end face of outer wall 20b of upper case 20 and the end face of outer wall 22b of lower case 22 face each other with a space therebetween. Therefore, there is a risk that a foreign substance, particularly a liquid such as water, enters between the end faces. In order to suppress the entry of the liquid, the end face of outer wall 20b of upper case 20 and the end face of outer wall 22b of lower case 22 have a multistage structure as a waterproof structure.

Specifically, as shown in FIG. 3, the end face of outer wall 20b of upper case 20 includes first upper step surface 20d and second upper step surface 20e. First upper step surface 20d and second upper step surface 20e extend substantially in a horizontal direction (the X-axis direction and the Y-axis direction). In addition, these two step surfaces may be parallel or non-parallel to each other.

Second upper step surface 20e is located at a high position with respect to first upper step surface 20d (that is, a position close to top surface 20a of upper case 20), and is located at an inner position with respect to first upper step surface 20d (that is, on an inner side of housing 12).

Furthermore, first upper step surface 20d and second upper step surface 20e at the end face of outer wall 20b of upper case 20 are connected by connection surface 20f extending substantially in the Y-axis direction and the Z-axis direction. Further, first upper step surface 20d is connected to outer side surface 20g of outer wall 20b, and second upper step surface 20e is connected to inner side surface 20h of outer wall 20b.

On the other hand, as shown in FIG. 3, the end face of outer wall 22b of lower case 22 includes first lower step surface 22d, second lower step surface 22e, and third lower step surface 22f. First lower step surface 22d, second lower step surface 22e, and third lower step surface 22f extend substantially in the horizontal direction (the X-axis direction and the Y-axis direction). In addition, these three step surfaces may be parallel to each other, and any one of the step surfaces may be non-parallel to the remaining step surfaces.

Second lower step surface 22e is located at a high position with respect to first lower step surface 22d (that is, a position close to top surface 20a of upper case 20), and is located at an inner position with respect to first lower step surface 22d (that is, on the inner side of housing 12). Third lower step surface 22f is located at a high position with respect to second lower step surface 22e (that is, a position close to top surface 20a of upper case 20), and is located at an inner position with respect to second lower step surface 22e (that is, on the inner side of housing 12).

Furthermore, first lower step surface 22d and second lower step surface 22e at the end face of outer wall 22b of lower case 22 are connected by connection surface 22g extending substantially in the Y-axis direction and the Z-axis direction. Further, second lower step surface 22e and third lower step surface 22f are connected by connection surface 22h extending substantially in the Y-axis direction and the Z-axis direction. First lower step surface 22d is connected to outer side surface 22j of outer wall 22b, and third lower step surface 22f is connected to inner side surface 22k of outer wall 22b.

As shown in FIG. 3, first upper step surface 20d at the end face of outer wall 20b of upper case 20 is at a position lower than and outside second lower step surface 22e at the end face of outer wall 22b of lower case 22 (that is, on the outer side of housing 12), and faces first lower step surface 22d. In the case of the present exemplary embodiment, first upper step surface 20d and first lower step surface 22d face each other at first distance L1 substantially in the vertical direction (Z-axis direction).

In addition, second upper step surface 20e at the end face of outer wall 20b of upper case 20 is located at a position lower than and outside third lower step surface 22f at the end face of outer wall 22b of lower case 22, and faces second lower step surface 22e. In the case of the present exemplary embodiment, second upper step surface 20e and second lower step surface 22e face each other at second distance L2 substantially in the vertical direction (Z-axis direction).

Note that first distance L1 and second distance L2 may change when manufacturing variations occur in upper case 20 and lower case 22, particularly when there is an allowable range variation in height of outer walls 20b, 22b. However, even when such variations occur, first distance L1 and second distance L2 are set to distances at which contact does not occur between first upper step surface 20d and first lower step surface 22d and between second upper step surface 20e and second lower step surface 22e.

Furthermore, in the case of the present exemplary embodiment, connection surface 20f at the end face of outer wall 20b of upper case 20 faces connection surface 22g at the end face of outer wall 22b of lower case 22 at third distance L3 substantially in the width direction (X-axis direction).

Moreover, in the case of the present exemplary embodiment, connection surface 22h at the end face of outer wall 22b of lower case 22 faces inner side surface 20h of outer wall 20b of upper case 20 at fourth distance L4 substantially in the width direction (X-axis direction).

According to such a waterproof structure of the end face of outer wall 20b of upper case 20 and the end face of outer wall 22b of lower case 22, housing 12 has a simple waterproof function for liquid that can enter housing 12 through a gap between these end faces. For example, housing 12 has a waterproof function equivalent to International Protection (IP) X3. This will be described with reference to a comparative example.

Figure 4:
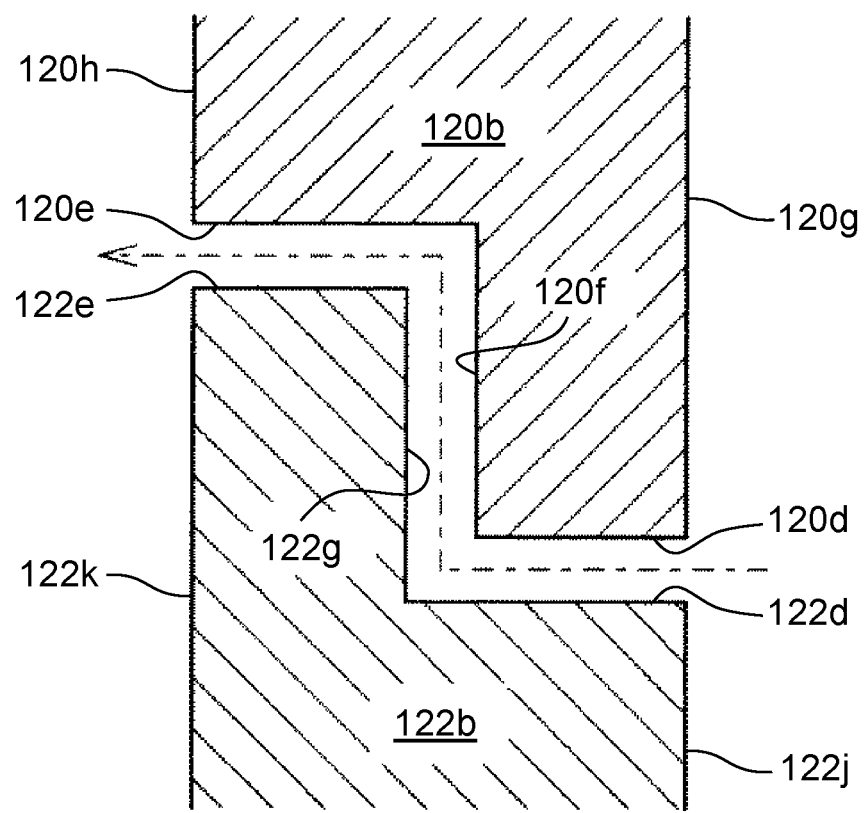
FIG. 4 is a cross-sectional view illustrating a gap between an end face of an outer wall of an upper case and an end face of an outer wall of a lower case in a housing of a comparative example.

FIG. 4 is a cross-sectional view illustrating a gap between an end face of an outer wall of an upper case and an end face of an outer wall of a lower case in a housing of a comparative example.

In the case of the housing of the comparative example illustrated in FIG. 4, an end face of outer wall 120b of an upper case includes first upper step surface 120d and second upper step surface 120e located at a high position and an inner position with respect to first upper step surface 120d. On the other hand, an end face of outer wall 122b of a lower case includes first lower step surface 122d and second lower step surface 122e located at a high position and an inner position with respect to first lower step surface 122d. First upper step surface 120d is at a position lower than a height position of second lower step surface 122e, and faces first lower step surface 122d. Second upper step surface 120e faces second lower step surface 122e.

In addition, first upper step surface 120d and second upper step surface 120e at the end face of outer wall 120b of the upper case are connected by connection surface 120f, first upper step surface 120d is connected to outer side surface 120g of outer wall 120b, and second upper step surface 120e is connected to inner side surface 120h of outer wall 120b. First lower step surface 122d and second lower step surface 122e at the end face of outer wall 122b of the lower case are connected by connection surface 122g, first lower step surface 122d is connected to outer side surface 122j of outer wall 122b, and second lower step surface 122e is connected to inner side surface 122k of outer wall 122b. Gaps of substantially the same size exist between first upper step surface 120d and first lower step surface 122d, between second upper step surface 120e and second lower step surface 122e, and between connection surface 120f and connection surface 122g.

In the case of the housing of the comparative example shown in FIG. 4, when a water droplet that has entered between first upper step surface 120d and first lower step surface 122d reaches second lower step surface 122e, the water droplet flows on second lower step surface 122e as it is and flows into the housing.

On the other hand, in the case of housing 12 of the present exemplary embodiment shown in FIG. 3, even if a water droplet that has entered between first upper step surface 20d and first lower step surface 22d reaches second lower step surface 22e, a possibility that the reached water droplet gets over third lower step surface 22f is small (compared to the comparative example). For example, a water droplet (i.e., a water droplet corresponding to IPX3) that has entered between first upper step surface 20d and first lower step surface 22d at an angle of 60 degrees with respect to the vertical direction (Z-axis direction) cannot get over third lower step surface 22f.

Therefore, housing 12 of the present exemplary embodiment has higher waterproof performance than the housing of the comparative example shown in FIG. 4.

Furthermore, in the case of the present exemplary embodiment, as illustrated in FIG. 3, one distance is different from other distances in first to fourth distances L1 to L4 between the end face of outer wall 20b of upper case 20 and the end face of outer wall 22b of lower case 22. This is because when first to fourth distances L1 to L4 are the same distance, there is a possibility that the liquid that has entered between the end faces reaches the inside of housing 12 due to a capillary phenomenon.

Further, in the present exemplary embodiment, as illustrated in FIG. 3, second distance L2 is larger than third distance L3. As a result, the liquid passing between connection surface 20f at the end face of outer wall 20b of upper case 20 and connection surface 22g at the end face of outer wall 22b of lower case 22 is depressurized as soon as it invades between second upper step surface 20e and second lower step surface 22e. Due to the depressurization, the possibility that the invading liquid gets over third lower step surface 22f of lower case 22 can be further reduced.

In addition, in the case of the present exemplary embodiment, in order to maintain the designability of housing 12, an outer contour at the end face of outer wall 20b of upper case 20 (that is, an outer edge of first upper step surface 20d) and an outer contour at the end face of outer wall 22b of lower case 22 (that is, an outer edge of first lower step surface 22d) overlap each other as viewed in the vertical direction (Z-axis direction). As a result, outer side surface 20g of outer wall 20b of upper case 20 and outer side surface 22j of outer wall 22b of lower case 22 form substantially one flat surface or curved surface having high designability. That is, housing 12 of the present exemplary embodiment has the above-described waterproof function without providing a structure for waterproofing on outer side surface 20g of outer wall 20b of upper case 20 and outer side surface 22j of outer wall 22b of lower case 22.

Furthermore, in the case of the present exemplary embodiment, as shown in FIG. 3, in a thickness direction (that is, in the width direction (X-axis direction) of electronic apparatus 10) connecting the outside and the inside of outer wall 20b of upper case 20, size W1 of first upper step surface 20d is made larger than size W2 of second upper step surface 20e. This is for preventing outer wall 20b from being damaged when an external force is applied due to, for example, dropping of housing 12. In contrast, in a case where the size of first upper step surface 20d in the X-axis direction is smaller than the size of second upper step surface 20e, that is, in a case where the thickness of a tip of outer wall 20b is thin, when an external force is applied to the tip, a crack may occur between connection surface 20f and second upper step surface 20e, and the tip may be missing in some cases. In the present exemplary embodiment, by way of example, the thickness direction connecting the outside and the inside of outer wall 20b of upper case 20 is the width direction (X-axis direction) of electronic apparatus 10. Alternatively, the thickness direction of outer wall 20b may be the depth direction (Y-axis direction) of electronic apparatus 10.

According to the present exemplary embodiment as described above, in the electronic apparatus in which the housing is configured such that the end faces of the outer walls of the two cases face each other, it is possible to suppress the entry of the liquid into the housing through between the end faces of the outer walls without using a seal member such as a packing.

The present disclosure has been described with reference to the above-mentioned exemplary embodiment. However, the present disclosure is not limited to the above-mentioned exemplary embodiment.

For example, in the case of the above-described exemplary embodiment, as illustrated in FIG. 1, the electronic apparatus is a notebook personal computer, but the exemplary embodiment of the present disclosure is not limited thereto. An exemplary embodiment of the present disclosure does not require waterproof performance against submersion, that is, an electronic apparatus having sufficient waterproof performance of IPX3 may be used.

That is, in a broad sense, an electronic apparatus according to an exemplary embodiment of the present disclosure includes: a housing including an upper case and a lower case; and an electronic component housed in the housing, wherein an end face of an outer wall of the upper case includes a first upper step surface and a second upper step surface located at a high position and an inner position with respect to the first upper step surface, an end face of the outer wall of the lower case includes a first lower step surface, a second lower step surface located at a high position and an inner position with respect to the first lower step surface, and a third lower step surface located at a high position and an inner position with respect to the second lower step surface, the first upper step surface is located at a low position with respect to the second lower step surface and faces the first lower step surface, and the second upper step surface is located at a low position with respect to the third lower step surface and faces the second lower step surface.

As described above, the exemplary embodiment has been described as an example of the technique of the present disclosure. For that purpose, the accompanying drawings and the detailed description have been provided.

Accordingly, the components described in the accompanying drawings and the detailed description include not only components essential for solving the problem, but also components that are not essential for solving the problem to illustrate the technique. For this reason, it should not be immediately recognized that those non-essential components are essential just because those non-essential components are described in the accompanying drawings and the detailed description.

In addition, the above-described exemplary embodiment is intended to illustrate the technique in the present disclosure, and therefore various changes, replacements, additions, omissions, and the like may be made within the scope of the claims and equivalents thereof.

The present disclosure is applicable to an electronic apparatus in which a housing includes an upper case and a lower case, and electronic components are housed in the housing.

What is claimed is:

1. An electronic apparatus comprising:
a housing including an upper case and a lower case; and
an electronic component housed in the housing,
wherein an end face of an outer wall of the upper case includes a first upper step surface and a second upper step surface located at a high position and an inner position with respect to the first upper step surface,
an end face of the outer wall of the lower case includes a first lower step surface, a second lower step surface located at a high position and an inner position with respect to the first lower step surface, and a third lower step surface located at a high position and an inner position with respect to the second lower step surface,
the first upper step surface is located at a low position with respect to the second lower step surface and faces the first lower step surface,
the second upper step surface is located at a low position with respect to the third lower step surface and faces the second lower step surface,
the upper case includes an upper boss portion protruding downward,
the lower case includes a lower boss portion protruding upward and supporting the upper boss portion,
the first upper step surface and the first lower step surface face each other at a first distance, and
the second upper step surface and the second lower step surface face each other at a second distance.

2. The electronic apparatus according to claim 1, wherein
a connection surface connecting the first upper step surface and the second upper step surface, and a connection surface connecting the first lower step surface and the second lower step surface face each other at a third distance, and
a connection surface connecting the second lower step surface and the third lower step surface, and an inner side surface of the outer wall of the upper case face each other at a fourth distance.

3. The electronic apparatus according to claim 2, wherein one of the first to fourth distances is different from other distances.

4. The electronic apparatus according to claim 2, wherein the second distance is larger than the third distance.

5. The electronic apparatus according to claim 1, wherein an outer contour at the end face of the outer wall of the upper case and an outer contour at the end face of the outer wall of the lower case overlap each other as viewed in a vertical direction.

6. The electronic apparatus according to claim 1, wherein a size of the first upper step surface is larger than a size of the second upper step surface in a thickness direction of the outer wall of the upper case.

\* \* \* \* \*